United States Patent
Ho (10) Patent No.: US 9,984,243 B1
(45) Date of Patent: *May 29, 2018

(54) DOCUMENTS WITH LOCATION ATTRIBUTES FOR ACCESS AND STORAGE

(71) Applicant: TP Lab, Inc., Palo Alto, CA (US)

(72) Inventor: Chi Fai Ho, Palo Alto, CA (US)

(73) Assignee: TP Lab, Inc., Palo Alto, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/650,661

(22) Filed: Jul. 14, 2017

Related U.S. Application Data (63) Continuation of application No. 14/736,276, filed on Jun. 11, 2015, now Pat. No. 9,740,873.

(51) Int. Cl.
*H04L 9/00* (2006.01)
*G06F 21/62* (2013.01)

(52) U.S. Cl.
CPC ........ *G06F 21/6209* (2013.01); *G06F 21/629* (2013.01)

(58) Field of Classification Search
CPC .................................................... H04L 63/101
See application file for complete search history.

(56) References Cited

U.S. PATENT DOCUMENTS

| | | | |
|---|---|---|---|
| 9,292,694 B1* | 3/2016 | Valceanu | G06F 21/577 |
| 2013/0171932 A1* | 7/2013 | Park | H04B 5/0031 |
| | | | 455/41.1 |
| 2016/0174043 A1* | 6/2016 | Ko | H04W 4/023 |
| | | | 455/456.1 |

* cited by examiner

*Primary Examiner* — Josnel Jeudy
(74) *Attorney, Agent, or Firm* — North Shore Patents, P.C.; Michele Liu Baillie (57) ABSTRACT

In electronic document access control, a document controller receives a document access request from an access device. The request is to access an electronic document previously stored in a datastore coupled to the document controller. The request includes a current location of the access device, and the electronic document is associated with an access location attribute. The document controller compares the current location of the access device with the access location attribute associated with the electronic document. In response to a match between the current location and the access location attribute, the document controller sends the electronic document to the access device. In response to no match between the current location and the access location attribute, the document controller does not send the electronic document to the access device.

18 Claims, 4 Drawing Sheets

DOCUMENTS WITH LOCATION ATTRIBUTES FOR ACCESS AND STORAGE

BACKGROUND OF THE INVENTION

Field

This invention relates generally to security, and more specifically, to location-based document for access and storage.

Related Art

Corporate and personal documents often contain confidential or private information. Storage of these documents is usually guarded while access to the documents is also limited to certain locations and persons. It is a common practice that companies and people store printed document in a locked cabinet or a safe, as well as electronic documents in computers within a company premises or at home. Access to these electronic documents is often limited only to within the company office or home.

The emergence of cloud computing is creating new challenges in the way people deal with documents. Companies, large and small, are moving to cloud computing and cloud storage. Individuals are adopting cloud storage and sharing. Cloud networks employ public network, including the Internet, to provide ease of access and storing and to reduce the cost of storage and services. Despite the convenience of cloud computing, risk of theft for data, document and identity create challenges that did not exist with paper documents. Today, it is not uncommon to see news about data theft such as credit card information, medical data, personal identity and other important company or personal documents. Among the theft victims, many of which are renowned companies, health care centers, credit card companies, e-commerce websites, celebrities, and even government agencies.

Many security measures and products in guarding computer and network access exist, although these measures are not effective. For each measure to secure network access, thieves continue find a hole to break in. For each security hole discovered, security professionals need to figure out a measure to plug the hole. It is a cat and mouse situation and a security arms race between the two camps. Unfortunately, the security professionals are the underdogs, and the thieves often have the upper hand.

In addition to the difficulty of plugging security holes, the pursuit and prosecution of the thieves are difficult as they often reside in a foreign land. Local and national laws often prevent the catching of the thieves and sometimes limit the ability to address the security holes.

The challenges lead many corporations and individuals to be unwilling to store confidential documents utilizing cloud computing technology, which is struggling with access security and data theft issues.

BRIEF SUMMARY OF THE INVENTION

According to one embodiment of the present invention, in a method for electronic document access control, a document controller receives from an access device, a document access request to access an electronic document previously stored in a datastore coupled to the document controller, the request comprising a current location of the access device, the electronic document being associated with an access location attribute. The document controller compares the current location of the access device with the access location attribute associated with the electronic document. In response to a match between the current location and the access location attribute, the document controller sends the electronic document to the access device by the document controller. In response to no match between the current location and the access location attribute, the document controller does not send the electronic document to the access device by the document controller.

In one aspect of the present invention, the access location attribute comprises a physical location where the electronic document is configured to be accessible.

In one aspect of the present invention, the access location attribute comprises a plurality of physical locations, wherein the electronic document is configured to be accessible when each of the plurality of physical locations match the current location.

In one aspect of the present invention, the current location of the access device is obtained from a location module coupled to the access device.

In one aspect of the present invention, the location module determines the current location from a location server.

In one aspect of the present invention, the request comprises a document identity, and the document controller matches the document identity with the electronic document, retrieves the access location attribute associated with the electronic document, and compares the current location and the access location attribute.

In one aspect of the present invention, the current location is determined to match the access location attribute when the current location is within a predetermine distance from the access location attribute.

In one aspect of the present invention, the request comprises an encryption key. the document controller retrieves the encryption key from the request, encrypts the electronic document using the encryption key, and sends the encrypted electronic document to the access device.

In one aspect of the present invention, the document controller sends another electronic document different from the electronic document to the access device.

In one aspect of the present invention, the document controller further stores the document access request in a request record storage, and generates a document access request report using document access requests stored in the request record storage.

System and computer program products corresponding to the above-summarized methods are also described and claimed herein.

DETAILED DESCRIPTION OF THE INVENTION

The following description is presented to enable one of ordinary skill in the art to make and use the present invention and is provided in the context of a patent application and its requirements. Various modifications to the embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
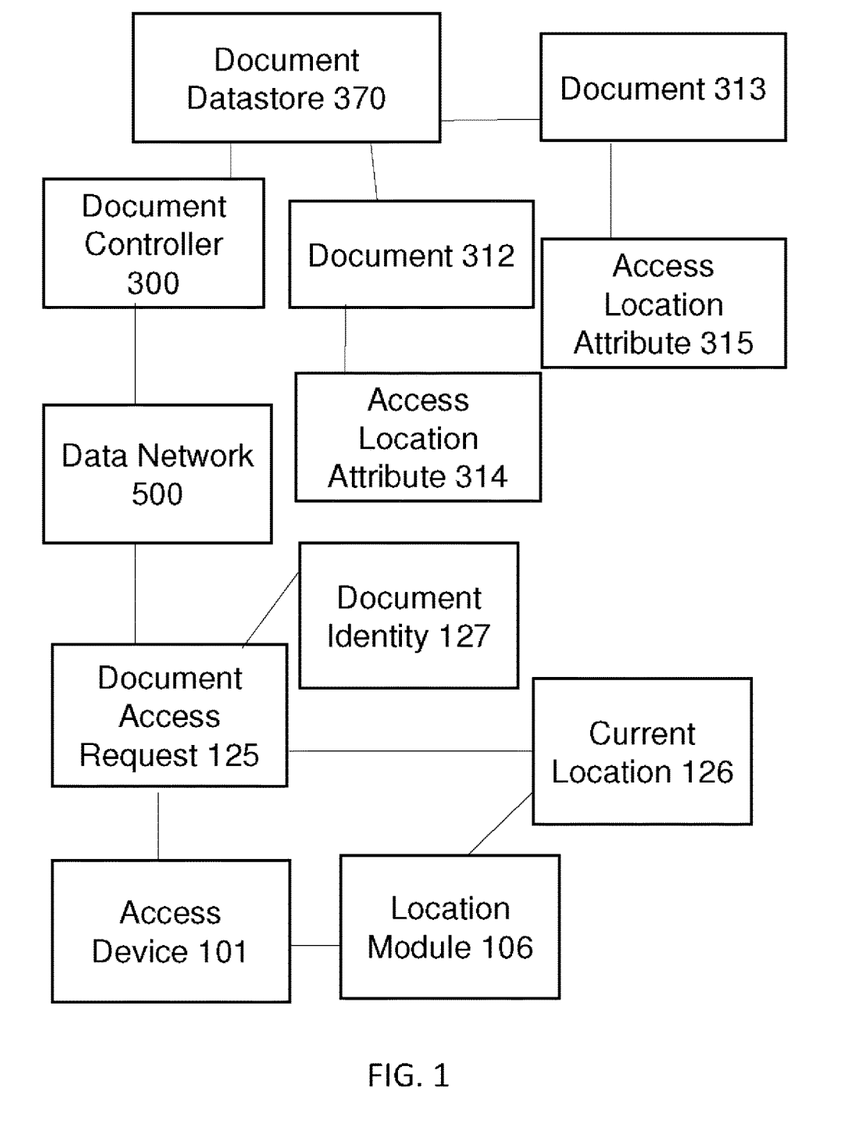
FIG. 1 illustrates an access device accessing a document with an access location according to embodiments of the present invention.

FIG. 1 illustrates an access device accessing a document over a data network according to embodiments of the present invention. In one embodiment, electronic document 312 being accessed is a corporate document such as an agreement, a contract, an office letter, a client letter, a corporate email, a software program, a report, a sales presentation, a meeting minute, a memorandum, a partnership contract, a transcript, a product list, a product manual, an internal memo, a customer order, a human resource document, a performance review, a candidate interview report, a financial report, a document related to sales data, a directory, a blueprint, a prototype specification, a piece of software source code, or a confidential document. In one embodiment, document 312 is a personal electronic document or belonging such as a medical record, a bill, a bank statement, a will, a monthly statement, a manuscript, a photo, an electronic identity document, a tax return, a business plan, a picture, an electronic painting, a piece of writing, a certificate, a sales receipt, an invoice, a lease agreement, a grant deed, a loan agreement, a letter, an electronic book, a work document, a song, an album, a business document delivered to a person over a data network, or a document a person stores in a data network. In one embodiment, document 312 is a commercial electronic document related to a purchase transaction such as a picture, an electronic book, a video, a song, an album, an invoice, a lease, an agreement, a letter, a user guide, a product specification, a manual, a receipt, a delivery notification, a message, a voice mail, a purchase order, or other transaction document. In one embodiment, document 312 includes a Bitcoin, a virtual coin, or virtual currency. In one embodiment, document 312 includes private information, personal identity, personal or corporate sensitive information, credit card information, or any information requiring designated accessing location.

In one embodiment, document 312 is stored in digital format so as to be accessible and deliverable over data network 500 to an access device 101. In one embodiment, access device 101 includes a security box where a digital key for the security box is stored in document 312. When access device 101 is situated at a designated location specified in access location attribute 314, document 312 can be accessed, the key is disclosed to access device 101, thus allowing the access device 101 to unlock the security box. Content stored inside the security box can then be retrieved, or additional content can be stored into the security box.

In one embodiment, document 312 is associated with an access location attribute 314. Access location attribute 314 indicates a physical location where document 312 would be accessible or allowed to be accessed. In one embodiment, document 312 is a corporate document configured to be accessible on a corporation's premises or office, and access location attribute 314 includes at least one physical location of the corporate office. In one embodiment, a physical location is a geo-physical location, a building street address, a building name, a floor number, a room number, an office number, a suite number, a cubical number, a drawer identity, a cabinet identity, or a location indicated on a facility map. For example, document 312 can be configured to be accessible in a manager office on a floor in a building at a street address within a city. In one embodiment, document 312 is a private personal document configured to be accessible in a home office of the document owner. In another example, document 312 can be configured to be accessible within a radius of 100 meters of a coordinate location in a map of a vineyard in a suburban town. Access location attribute 314 includes, but is not limited, one or more of a home address, a floor number, an apartment number, a bedroom number, or a location within the home. For example, document 312 can be configured to be accessible in the home office at a residential street address, or within 10 feet from a closet in a bedroom of an apartment unit in an apartment complex in a city. In one embodiment, document 312 is a company document to be delivered to a customer, and access location attribute 314 includes, but is not limited to, one or more physical location of the customer. In one embodiment, a physical location may also be a business address, a store name, a city name, a neighborhood identity, or a district. In one embodiment, a physical location includes a radius distance of another physical location. In one embodiment, a plurality of physical locations refers to an area bounded by the plurality of physical locations.

In one embodiment, data network 500 includes the Internet, a consumer home network, an enterprise network, a local area network, a hotspot, a data network in a store, a wireless network, a mobile broadband network, a cellular data network, a private network, a corporate network, or a network in a data center. In one embodiment, data network 500 includes a public cloud network, a private cloud network, a virtual private network (VPN), an ATM network, a Frame Relay network, a MPLS network, or an optical network.

In one embodiment, location module 106 is physically detached from access device 101 but is otherwise coupled to access device 101, and the location module 106 provides a current location 126 of access device 101 to access device 101. Location module 106 is described below with reference to FIG. 2.

In one embodiment, access device 101 sends document access request 125 to document controller 300. In one embodiment, document controller 300 and access device 101 are computing devices communicating over data network 500. In one embodiment document access request 125 employs a Web based protocol using, for example, HTTP, secure HTTP, secure TCP, a secure session protocol such as IPSec, FTP, a file transfer protocol, a shared folder protocol, a shared document protocol, RPC, remote procedure call, a network or distributed file system protocol. In one embodiment, document access request 125 is a request of a Web service, a social network service, a document sharing service, an online share folder service, a cloud storage service, a photo storage service, a messaging service, an email service, a voice message service, a document delivery service, an online delivery service, a mobile app service, a television or video service, a news access service, a collaboration service, a teleconferencing service, a document sharing service, or a network-based service allowing access of document 312. In one embodiment, access request 125 includes document identity 127. In one embodiment, access request 125 includes current location 126. In one embodiment, current location 126 includes one or more physical locations. In one embodiment, current location 126 includes location sensing data obtained from a location sensor (not shown). In one embodiment, current location 126 includes an identity of a landmark or a physical object allowing document controller 300 or access device 101 to resolve the identity to a physical location, such as map coordinates, Global Positioning System (GPS) coordinates, or a physical address. In one embodiment, access device 101 obtains current location 126 from location module 106 and includes current location 126 in access request 125. In one embodiment, access device 101 sends current location 126 to document controller 300 separately from access request 125.

In one embodiment, location module 106 determines current location 126 using a location sensor (not shown), described further below, or using a network computer such as a location server (not shown) over a data network. In one embodiment, location module 106 determines current location 126 from time to time, such as every minute, 30 seconds, 5 minutes, or an hour. In one embodiment, location module 106 determines current location 126 when access device 101 requests the current location 126. In one embodiment, access device 101 obtains current location 126 from time to time, and provides current location 126 to document controller 300 as access device 101 obtains a more recent current location 126. In one embodiment, document controller 300 requests that access device 101 provide current location 126 from time to time or for a more recent current location 126.

In one embodiment, after document controller 300 receives document access request 125, document controller 300 retrieves document identity 127 from access request 125. In one embodiment, document identity 127 includes a file name, a folder name, a document title, a document key, a document control number, or a plurality of document attributes describing the corresponding document. Document controller 300 matches document identity 127 to document 312 and determines there is a match. In one embodiment, document controller 300 determines document 312 is associated with access location attribute 314. Document controller 300 retrieves access location attribute 314. In one embodiment, document controller 300 obtains current location 126 from access request 125 or from access device 101. Document controller 300 compares access location attribute 314 with current location 126. In one embodiment, document controller 300 compares a geo-physical location in access location attribute 314 to a geo-physical location in current location 126. In one embodiment, document controller 300 compares locations, such as building names, room numbers, office numbers, floor numbers, street addresses, room identities, room names, district names, mountain names, or city names. In one embodiment, document controller 300 converts access location attribute 314 and/or current location 126 to a common format before comparing. For example, access location attribute 314 includes, but is not limited to, a street address, and a geo-physical location included in current location 126 is converted into a street address before the comparing of the access location attribute 314 with the current location 126. In one example, current location 126 includes a piece of sensing data such as an identity of a landmark or a network equipment. Document controller 300 queries a network location server to resolve the landmark identity or network equipment into a street address, a floor number, a map coordinate or other location format compatible to access location attribute 314. In one embodiment, document controller 300 determines whether the current location 126 is within a predetermined distance from the access location attribute 314, such as within a radius range, an area, a neighborhood of access location attribute 314. If so, then the access location attribute 314 is determined to match the current location 1362 by the document controller 300. Otherwise, the document controller 300 determines that there is no match. In one embodiment, the current location 126 includes a plurality of locations, where if the access location attribute 314 is determined to match each of the plurality of locations, the document controller 300 determines that there is a match.

In one embodiment, document controller 300 determines there is a match between the current location 126 and the access location attribute 314, and document controller 300 further determines document 312 is a document requested by access device 101 by matching document identity 127 and document 312. Document controller 300 sends document 312 to access device 101. In one embodiment, document controller 300 sends a positive response to access request 125 prior to sending document 312. In one embodiment, document controller 300 sends document 312 to access device 101 in a communication session different from a communication session over which the access request 125 was sent to the document controller 300.

In one embodiment, document controller 300 applies one or more other security measures prior to sending document 312. In one embodiment, document controller 300 decrypts document 312, using a key included in access request 125. In one embodiment, document controller 300 authenticates access device 101 or a user of access device 101 prior to sending document 312. In one embodiment, document controller 300 uses an encryption key included in access location attribute 314 to decrypt document 312.

In one embodiment, document controller 300 determines document identity 127 matches document 313. Document controller 300 further compares current location 126 against access location attribute 315 of document 313. In one embodiment, document controller 300 determines there is no match between current location 124 and access location attribute 315. In response, document controller 300 does not send document 313 to access device 101. In one embodiment, document controller 300 sends an error message to access device 101. In one embodiment, document controller 300 indicates in the error message current location 124 does not match access location attribute 315. In one embodiment, document controller 300 is silent and does not send any response to the access request to access device 101. In one embodiment, document controller 300 sends another document, different from document 313, to access device 101.

In one embodiment, document controller 300 is coupled to document datastore 370 which includes a plurality of documents, including document 312 and document 313. The plurality of documents is stored in the datastore 370 prior to the receipt of the access request 125 from the access device 101. In document controller 300 obtains document 312 or document 313 from datastore 370 prior to matching document 312 or document 313 to access request 125. In one embodiment, document controller 300 matches document identity 127 against datastore 370 to select document 312 or document 313.

In one embodiment, document controller 300 records access request 125 for purposes of tracking access requests, as described further below with reference to FIG. 4.

Figure 2:
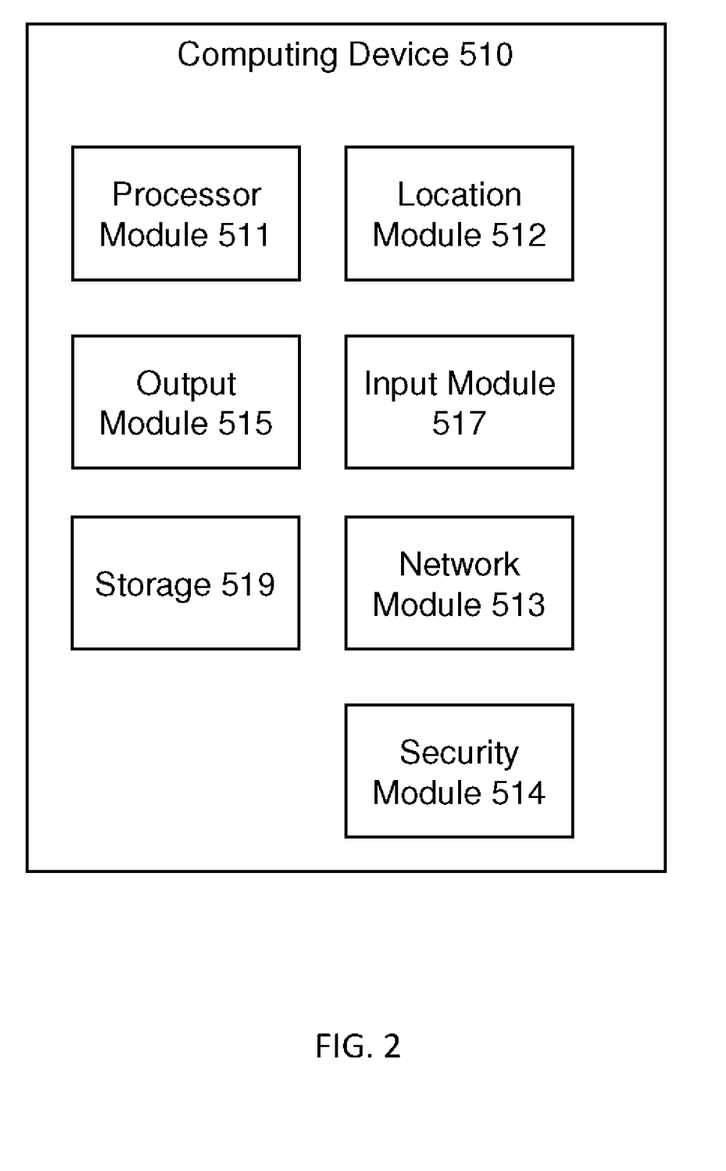
FIG. 2 illustrates a computing device according to embodiments of the present invention.

FIG. 2 illustrates an exemplary embodiment of hardware components of a computing device which can be used as an access device or a document controller according to the present invention. In one embodiment, computing device 510 includes a processor module 511, an output module 515, an input module 517, storage 519, a network module 513, a security module 514 and a location module 512. In one embodiment, processor module 511 includes one or more general processors, a multi-core processor, an application specific integrated circuit based processor, a system on a chip (SOC) processor or an embedded processor. In one embodiment, output module 515 includes a display for displaying images and text, an audio speaker, an image projector, one or more light indicator, data interfaces such as USB, HDMI, DVI, DisplayPort, Firewire, thunderbolt, or other forms of computer output. In one embodiment, input module 517 includes a physical or logical keyboard, buttons, keys, microphones, sensors such as optical sensor, infrared (IR) sensor, camera sensor, motion sensor, direction sensor, any sensor that is usable by a user to provide input to computing device 510. In one embodiment, storage 519 includes a main memory, a hard disk drive (HDD), a solid state drive (SSD), a memory card, a ROM module, a RAM module, a USB disk, a storage compartment, a data storage component or other storage component. In one embodiment, network module 513 includes hardware and software to connect to a data network such as Ethernet, a wired network, a wireless network, a cellular network, a mobile network, a Bluetooth network, a NFC network, a personal area network (PAN), a WiFi network, or an optical network. Storage 519 includes executable instructions when executed by the processor module 511 of computing device 510 implement one or more functionality of the current invention. In one embodiment, location module 512 includes a GPS module, a wireless signal sensor, or a processor to calculate a location based on received location signals. In one embodiment, location module 512 connects to network module 513 to use network module 513 to obtain signals of one or more network interfaces. In one embodiment, location module 512 connects to network module 513 to send a query to a network computer to determine a location based on received signals. In one embodiment, location module 512 connects to processor module 511 so as to use process module 511 to calculate or determine a location based on received signals. In one embodiment, security module 512 includes a hardware encryption/decryption component. In one embodiment, security module 512 includes a plurality of software programming instructions which when executed performs encryption or decryption functionality.

In one embodiment, computing device 510 does not include all the modules. In one embodiment, computing device 510 does not have input module 517 or output module 515. In one embodiment, computing device 510 does not have location module 512 or network module 513. In one embodiment, computing device 510 connects to an external output module 515 or an external input module 517.

In one embodiment, access device 101 is implemented in a personal computer, a laptop, a smartphone, a smart watch, a smart wearable, a cashier device, a point of sales (POS) device, a wearable computing device, a smart medical device, a jewelry box, a medical device, a robot, a hard-disk drive, a USB drive, a memory card device, a camera, a lock, a corporate phone, a data sentry box, a tablet, a telepresence system, a smart home gadget, a set top box, a smart camera, a file server, or in another computing device capable of accessing documents or acquiring data and storing the acquired data over a data network to a network computing device.

In one embodiment, document controller 300 is implemented in a terminal (such as a personal computer, smartphone, or tablet), a network storage, a server computer, a home storage device, a smart storage, a media center, a video server, a photo server, an email server, a document management system, or a messaging server. In one embodiment, document controller 300 includes a cloud storage system, a cloud computing system, an enterprise application server system, a database management system, or a web portal.

Figure 3:
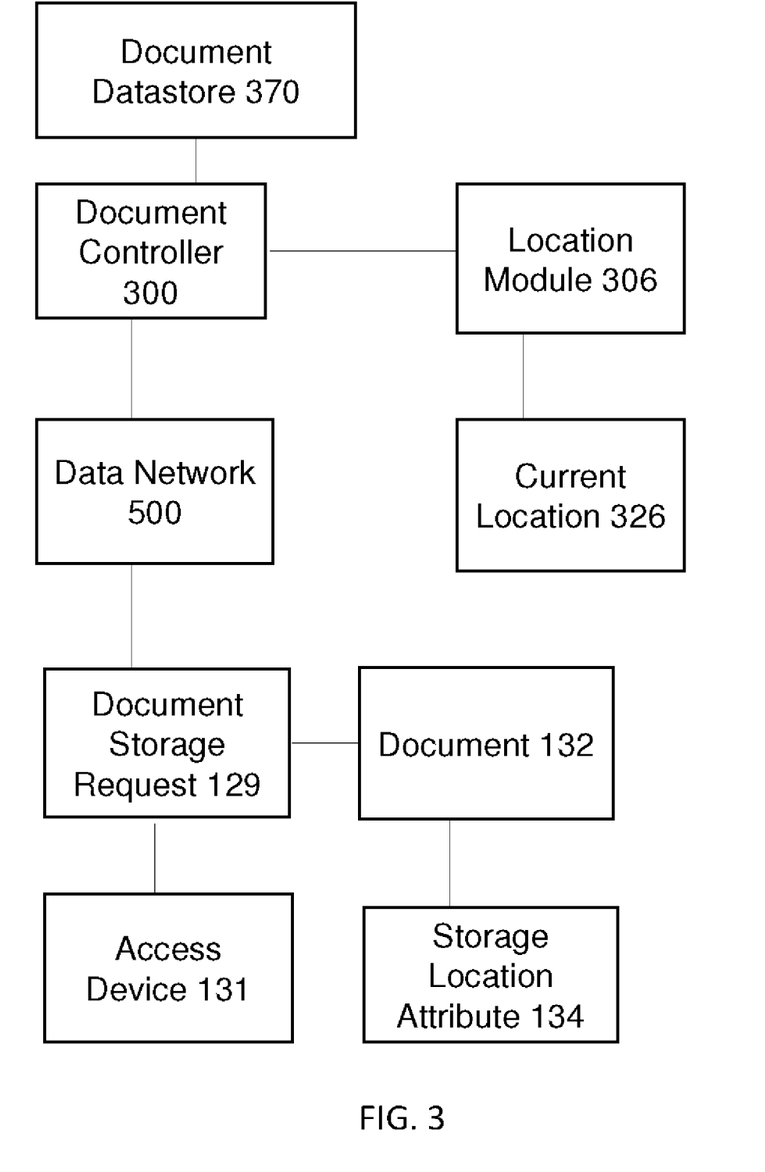
FIG. 3 illustrates a document controller storing a document with a storage location attribute according to embodiments of the present invention.

FIG. 3 illustrates a document controller storing a document over a data network according to embodiments of the present invention. Embodiments of document 132 are described above with reference to FIG. 1. In one embodiment, document 132 includes data acquired by access device 131, through one or more sensors coupled to access device 131. In one embodiment, document 132 is in a digital format so that it may be stored over data network 500.

In one embodiment, document 132 includes storage location attribute 134, indicating one or more physical locations where document 132 would be allowed to be stored. In one embodiment, document 132 is a corporate document configured to be allowed to be stored on a corporation's premises, and storage location attribute 134 includes the physical location of the corporate office. In one embodiment, document 132 is a private personal document configured to be allowed to be stored in a home office of the document owner, and storage location attribute 134 include an address of the home and a location within the home. In one embodiment, access device 131 is physically located in a country with a legal requirement to store document 132 within the country, and storage location attribute 134 includes a country name. In one embodiment, storage location attribute 134 includes, but is not limited to, a physical location such as a geo-physical location, a street address, a store name, a building name, a floor number, a room number, an area within a building, a cage number, a cubical number, a map coordinate, a mark on a facility map, a district name, a city name, a country name, a country code, a store number, or a location pin on a map. In one embodiment, a physical location includes a distance, a radius, or a boundary around physical location. In one embodiment, storage location attribute 134 includes one or more physical locations.

In one embodiment, access device 131 sends document storage request 129 via data network 500 to document controller 300. In one embodiment, document storage request 129 includes document 132. In one embodiment document storage request 129 employs a Web based protocol using, for example, HTTP, secure HTTP, secure TCP, a secure session protocol such as IPSec, FTP, a file transfer protocol, a shared folder protocol, a shared document protocol, RPC, remote procedure call, a network or distributed file system protocol. In one embodiment, document storage request 129 is a request of a Web service, a social network service, a document sharing service, an online share folder service, a cloud storage service, a photo storage service, a messaging service, an email service, a voice message service, a document delivery service, an online delivery service, a mobile app service, a television or video service, a news access service, a collaboration service, a teleconferencing service, a document sharing service, or a network-based service allowing storing of document 132.

In one embodiment, document controller 300 receives document storage request 129, and in response, retrieves document 132 and storage location attribute 134. In one embodiment, document controller 300 includes location module 306 and obtains current location 326 of the document controller 300 from location module 306. In one embodiment, current location 326 includes one or more physical locations. In one embodiment, current location 326 includes location sensing data obtained from a location sensor (not shown). In one embodiment, current location 326 includes an identity of a landmark or a physical object allowing document controller 300 to resolve the identity to a physical location which may include a geo-physical location, such as map coordinates, Global Positioning System (GPS) coordinates, a physical address, an equipment rack number, a cage number or identity, a room identity, a floor number, a data center name, a building name, a city name, or a country name. In one embodiment, location module 306 includes a network location server to resolve a landmark identity or a network equipment information to a physical location. In one embodiment, current location 326 includes one or more physical locations.

Document controller 300 compares current location 326 and storage location attribute 134. In one embodiment, document controller 300 determines there is a match between current location 326 and storage location attribute 134, and in response, document controller 300 stores document 132 into document controller 300. In one embodiment, document controller 300 stores document 132 onto a document datastore 370 coupled to document controller 300. In one embodiment, document controller 300 applies a security policy, such as encryption, to document 132 prior to storing document 132. In one embodiment, document controller 300 stores storage location attribute 134 together with document 132, such as part of the document's metadata. In one embodiment, document controller 300 stores current location 326 together with document 132, such as part of the document's metadata. In one embodiment, document controller 300 sends an indication to access device 131 of a successful storage of document 132. In one embodiment, document controller 300 sends a notification to access device 131 with current location 326. In one embodiment, document controller 300 sends a notification to access device 131 that current location 326 is stored with document 132.

In one embodiment, document controller 300 determines there is no match between current location 326 and storage location attribute 134. In response, document controller 300 does not store document 132. In one embodiment, document controller 300 sends an indication to access device 131 of an error in storing document 132. In one embodiment, document controller 300 sends a notification to access device 131 that the storage location attribute 134 does not match current location 326. In one embodiment, document controller 300 discards storage request 129 and is silent, not responding to the storage request 129. In one embodiment, document controller 300 sends a positive response to access device 131 indicating a successful storage but does not actually store the document 132. In one embodiment, document controller 300 asks access device 131 to submit another storage location attribute.

Once stored, the document 132 may be associated with an access location attribute in the manner similar to documents 312 or 313, described above with reference to FIG. 1. The access location attribute associated with document 132 may be the same or different from the storage location attribute 134.

Figure 4:
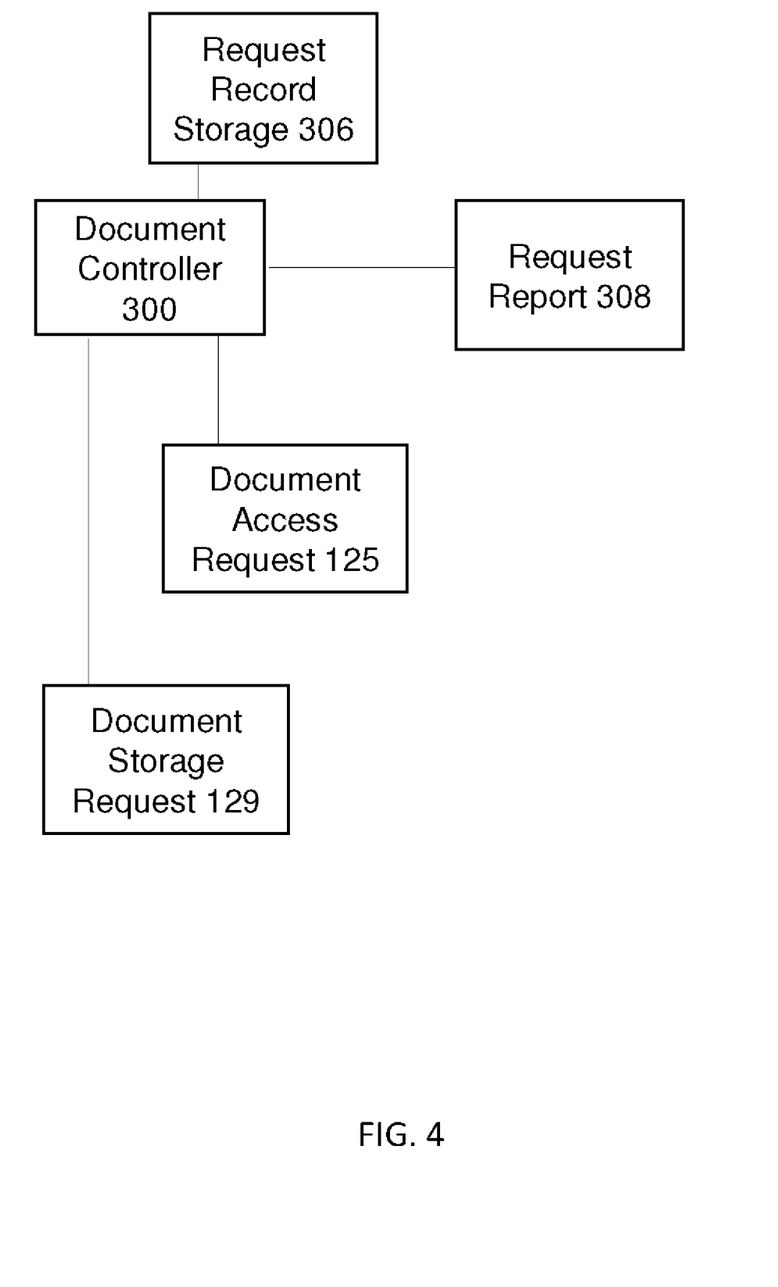
FIG. 4 illustrates a process of tracking accesses and storage of documents over a data network according to embodiments of the present invention.

FIG. 4 illustrates a process of tracking access and storage requests of documents over a data network according to embodiments of the present invention. As described above, document controller 300 receives document access request 125 or document storage request 129. In one embodiment, document controller 300 stores the requests in request record storage 306, which is associated with a datastore coupled to document controller 300. In one embodiment, document controller 300 stores a result of processing access request 125, such as whether access request 125 matches an access location attribute or document identity. In one embodiment, document controller 300 stores additional information concerning access request 125 in request record storage 306, including, but not limited to, one or more of a current location, a document identity, information of access device sending access request 125, one or more user information of user(s) of the access device, and a time when access request 125 is processed.

In one embodiment, document controller 300 stores a result of processing storage request 129, such as whether storage request matches a current location of the document controller 300. In one embodiment, document controller 300 stores additional information concerning storage request 129 in request record storage 306, including but not limited to, one or more of storing location pin, a current location of document controller 300, some document information of document being stored, information of access device sending storage request 129, one or more user information of user(s) of the access device, and a time when storing request 129 is processed.

In one embodiment, document controller 300 generates a request report 308 using the requests stored in the request record storage 306. In one embodiment, request report 308 includes a report of failed document accesses that includes, but is not limited to, one or more of access devices making the failed accesses, current locations of the access devices, times of the access requests, document identities of access requests, and user information of the access devices. In one embodiment, request report 308 includes a report of successful document accesses that includes, but is not limited to, one or more of access devices making the successful accesses, current locations of the access devices, times of the access requests, document identities of access requests, and user information of users of the access devices. In one embodiment, request report 308 includes, but is not limited to, a report of failed document storage requests, a report of successful document storage requests, a report of access requests for a time period, or other report of tracked access and storing activities. In one embodiment, request report 308 is used to trace a security breach involving a sensitive document. In one embodiment, request report 308 is used to trace activity of a specific access device. In one embodiment, request report 308 is used to track storage of or accesses to a specific document. In one embodiment, request report 308 is used to verify that a document was delivered successfully to an access device at a location matching the access location attribute associated with the document.

The present invention can take the form of an entirely hardware embodiment, an entirely software embodiment or an embodiment containing both hardware and software elements. In a preferred embodiment, the present invention is implemented in software, which includes but is not limited to firmware, resident software, microcode, etc.

Furthermore, the present invention can take the form of a computer program product accessible from a computer usable or compute readable storage medium providing program code for use by or in connection with a computer or any instruction execution system. For the purposes of this description, a computer usable or computer readable storage medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk.

Current examples of optical disks include compact disk-read only memory (CD-ROM), compact disk-read/write (CD-R'W) and DVD. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, point devices, etc.) can be coupled to the system either directly or through intervening 110 controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for tracking electronic document access requests by a computing device comprising a document controller, comprising:
   (a) receiving, by the document controller from an access device over a data network, a document access request to access an electronic document previously stored in a document datastore coupled to the document controller, the request comprising a current location at which the access device resides, the current location comprising location sensing data obtained from a location sensor comprised in the access device, the electronic document being associated with an access location attribute, wherein the current location comprises a geo-physical location and a location within a physical structure;
   (b) processing, by the document controller, the document access request, the processing comprising:
      (b1) comparing, by the document controller, the geo-physical location with the access location attribute, and the location within the physical structure with the access location attribute associated with the electronic document;
      (b2) in response to a match between the geo-physical location and the access location attribute, and between the location within the physical structure and the access location attribute, sending the electronic document to the access device by the document controller over the data network; and
      (b3) in response to no match between the geo-physical location and the access location attribute, or no match between the location within the physical structure and the access location attribute, not sending the electronic document to the access device by the document controller;
   (c) storing, by the document controller, a result of the processing of the document access request in a request record datastore, the stored result comprising the document access request, the current location, and whether the current location matched the access location attribute;
   (d) receiving, by the document controller, a report request for results stored in the request record datastore; and
   (e) in response to the report request, generating, by the document controller, a report comprising the stored result.

2. The method of claim 1, wherein the geo-physical location comprises one or more of: a street address; a city name; global positioning system coordinates; a store name; a neighborhood identity; a district; a landmark identity; and map coordinates.

3. The method of claim 1, wherein the location within a physical structure comprise one or more of: a room number; a floor number; an office number; a suite number; a cubical number; a drawer identity; cabinet identity; a location indicated on a facility map; an apartment number; and a location within a home.

4. The method of claim 1, wherein the comparing (b1) further comprises:
   (b1i) converting, by the document controller, one or more of the geo-physical location, the location within the physical structure, and the access location attribute to a common format; and
   (b1ii) comparing, by the document controller, the geo-physical location with the access location attribute, and the location within the physical structure with the access location attribute associated with the electronic document.

5. The method of claim 1, wherein the access location attribute comprises a radius distance.

6. The method of claim 5, wherein the comparing (b1) comprises:
(b1i) determining, by the document controller, whether the geo-physical location reside within the radius distance from the access location attribute, and whether the location within the physical structure reside within the radius distance from the access location attribute; and
(b1ii) determining the match between the geo-physical location and the access location attribute, and between the location within the physical structure and the access location attribute, when the geo-physical location and the location within the physical structure reside within the radius distance from the access location attribute.

7. A non-transitory computer readable medium comprising computer readable program code embodied therein for tracking electronic document access requests, wherein when executed by at least one hardware processor causes the at least one hardware processor to:
(a) receive, from an access device over a data network, a document access request to access an electronic document previously stored in a document datastore coupled to the document controller, the request comprising a current location at which the access device resides, the current location comprising location sensing data obtained from a location sensor comprised in the access device, the electronic document being associated with an access location attribute, wherein the current location comprises a geo-physical location and a location within a physical structure;
(b) process the document access request, the process comprising:
(b1) compare the geo-physical location with the access location attribute, and the location within the physical structure with the access location attribute associated with the electronic document;
(b2) in response to a match between the geo-physical location and the access location attribute, and between the location within the physical structure and the access location attribute, send the electronic document to the access device over the data network; and
(b3) in response to no match between the geo-physical location and the access location attribute, or no match between the location within the physical structure and the access location attribute, not send the electronic document to the access device;
(c) store a result of the processing of the document access request in a request record datastore, the stored result comprising the document access request, the current location, and whether the current location matched the access location attribute;
(d) receive a report request for results stored in the request record datastore; and
(e) in response to the report request, generate a report comprising the stored result.

8. The medium of claim 7, wherein the geo-physical location comprises one or more of: a street address; a city name; global positioning system coordinates; a store name; a neighborhood identity; a district; a landmark identity; and map coordinates.

9. The medium of claim 7, wherein the location within a physical structure comprise one or more of: a room number; a floor number; an office number; a suite number; a cubical number; a drawer identity; cabinet identity; a location indicated on a facility map; an apartment number; and a location within a home.

10. The medium of claim 7, wherein the compare (b1) further comprises:
(b1i) convert one or more of the geo-physical location, the location within the physical structure, and the access location attribute to a common format; and
(b1ii) compare the geo-physical location with the access location attribute, and the location within the physical structure with the access location attribute associated with the electronic document.

11. The medium of claim 7, wherein the access location attribute comprises a radius distance.

12. The medium of claim 11, wherein the compare (b1) comprises:
(b1i) determine whether the geo-physical location reside within the radius distance from the access location attribute, and whether the location within the physical structure reside within the radius distance from the access location attribute; and
(b1ii) determine the match between the geo-physical location and the access location attribute, and the between the location within the physical structure and the access location attribute, when the geo-physical location and the location within the physical structure reside within the radius distance from the access location attribute.

13. A system, comprising:
at least one hardware processor; and
a non-transitory computer readable medium comprising computer readable program code embodied therein for tracking electronic document access requests, wherein when executed by the at least one hardware processor causes the at least one hardware processor to:
(a) receive, from an access device over a data network, a document access request to access an electronic document previously stored in a document datastore coupled to the document controller, the request comprising a current location at which the access device resides, the current location comprising location sensing data obtained from a location sensor comprised in the access device, the electronic document being associated with an access location attribute, wherein the current location comprises a geo-physical location and a location within a physical structure;
(b) process the document access request, the process comprising:
(b1) compare the geo-physical location with the access location attribute, and the location within the physical structure with the access location attribute associated with the electronic document;
(b2) in response to a match between the geo-physical location and the access location attribute, and between the location within the physical structure and the access location attribute, send the electronic document to the access device over the data network; and
(b3) in response to no match between the geo-physical location and the access location attribute, or no match between the location within the physical structure and the access location attribute, not send the electronic document to the access device;
(c) store a result of the processing of the document access request in a request record datastore, the stored result comprising the document access request, the current location, and whether the current location matched the access location attribute;

(d) receive a report request for results stored in the request record datastore; and (e) in response to the report request, generate a report comprising the stored result.

14. The system of claim 13, wherein the geo-physical location comprises one or more of: a street address; a city name; global positioning system coordinates; a store name; a neighborhood identity; a district; a landmark identity; and map coordinates.

15. The system of claim 13, wherein the location within a physical structure comprise one or more of: a room number; a floor number; an office number; a suite number; a cubical number; a drawer identity; cabinet identity; a location indicated on a facility map; an apartment number; and a location within a home.

16. The system of claim 13, wherein the compare (b1) further comprises:

(b1i) convert one or more of the geo-physical location, the location within the physical structure, and the access location attribute to a common format; and (b1ii) compare the geo-physical location with the access location attribute, and the location within the physical structure with the access location attribute associated with the electronic document.

17. The system of claim 13, wherein the access location attribute comprises a radius distance.

18. The system of claim 17, wherein the compare (b1) comprises:

(b1i) determine whether the geo-physical location reside within the radius distance from the access location attribute, and whether the location within the physical structure reside within the radius distance from the access location attribute; and (b1ii) determine the match between the geo-physical location and the access location attribute, and between the location within the physical structure and the access location attribute, when the geo-physical location and the location within the physical structure reside within the radius distance from the access location attribute.

* * * * *